United States Patent [19]

Stevens

[11] 4,006,068
[45] Feb. 1, 1977

[54] POLYMERCAPTOESTERS OF POLYGLYCIDOLS

[75] Inventor: Violete L. Stevens, Midland, Mich.

[73] Assignee: The Dow Chemical Company, Midland, Mich.

[22] Filed: Apr. 30, 1975

[21] Appl. No.: 573,225

[52] U.S. Cl. .................... 204/159.11; 204/159.16; 260/47 EP; 260/79; 260/399; 260/468 J; 260/470; 260/481 R

[51] Int. Cl.² .................... C08F 283/14

[58] Field of Search ............ 260/79, 47 EP, 481 R, 260/399, 468 J, 470; 204/159.16, 159.11

[56] References Cited
UNITED STATES PATENTS

| | | | |
|---|---|---|---|
| 3,278,496 | 10/1966 | LeFave et al. | 260/79 |
| 3,549,565 | 12/1970 | Jones et al. | 260/7.5 |
| 3,879,471 | 4/1975 | Farber | 260/79 |

*Primary Examiner*—Melvyn I. Marquis
*Attorney, Agent, or Firm*—David H. Fifield

[57] ABSTRACT

Polymercaptocarboxylic esters of polyglycidols comprising units represented by the formula

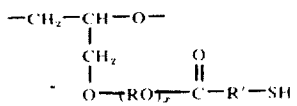

are disclosed as well as a method for utilizing the same to prepare cross-linked polymeric compositions.

21 Claims, No Drawings

POLYMERCAPTOESTERS OF POLYGLYCIDOLS

BACKGROUND OF THE INVENTION

The invention relates to polymercapto derivatives of polyether condensation polymers which are formed by esterifying, with a mercaptocarboxylic acid, a polyoxyalkylene backbone bearing pendant hydroxymethyl groups. It also relates to curable compositions and to methods for forming cross-linked polymers using said compositions.

Previously, compositions having polymercapto-functionality have been prepared by condensing a mercaptoalkanoic acid with lower polyols such as glycerol, pentaerythritol, ethylene or propylene glycol and the like or with polyhydroxy polyethers generated by such a polyol initiator condensed with an alkylene oxide such as ethylene or propylene oxide; U.S. Pat. No. 2,789,958; 3,549,565.

Such compounds are limited in utility by the fact that the number of mercapto functions available is limited by the functionality of the initiator and because the backbones are of limited variety. In contrast, the instant compounds have relatively unlimited mercapto-functionality due to the controllable nature of the unit (I) below, as well as great flexibility in the polymer backbone to which said mercapto groups are attached. This property makes them especially useful in preparing cross-linked polymeric materials having a wide variety of properties, including variable cure rates and variable solubility due to the varied nature of the polyoxyalkylene backbones of the invention compounds and the variability of the degree of mercapto-functionality.

SUMMARY OF THE INVENTION

Comprising the invention is a condensation polymer comprising at least one unit represented by the formula

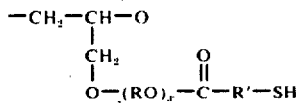
(1)

wherein R is independently in each unit the residue of a ring-opened alkylene oxide; R' is independently in each unit a divalent $C_1$-$C_{20}$ hydrocarbon residue of a mercaptocarboxylic acid and, preferably, is independently in each unit an alkylene, cycloalkylene, alkarylene, aralkylene or arylene moiety comprising from 1 to about 20 carbon atoms; and $x$ is independently in each unit zero or a positive integer up to about 100, provided that when said polymer comprises only one unit represented by formula (I) it additionally comprises at least two units of a ring-opened alkylene oxide and $x$ is zero. The invention also comprises curable compositions and methods for preparing cross-linked polymeric materials using the polymercaptans comprising units of formula (I). These polymercaptans are also useful for forming oxidatively-curable films. Invention compounds are also useful as accelerators for amine-curing of polyoxiranes and as chain-transfer agents for the polymerization of polyethylenically unsaturated compositions.

Preferred in the invention are polymers which further comprise at least one ring-opened comonomer selected from the group of alkylene oxides consisting of ethylene oxide, propylene oxide, 1,2-butylene oxide, 2,3-butylene oxide, epichlorohydrin, epibromohydrin, glycidol, n-butyl glycidyl ether, phenyl glycidyl ether, styrene oxide and tetrahydrofuran. An especially preferred comonomer is ethylene oxide or propylene oxide. Also preferred in the invention are compounds comprising formula (I) unit wherein R is the residue of a ring-opened alkylene oxide selected from the same group, especially where R is ethylene or propylene. Further preferred in the invention are those polymers wherein $x$ is zero or a small integer up to 10. Polymers wherein —R'— is alkylene of about 1–6 carbon atoms are preferred and those wherein —R'— is methylene, ethylene, or ethylidene are particularly preferred. In another preferred embodiment of the invention, the polymercapto condensation polymer has a weight average molecular weight of from about 314 to about 20,000.

Especially preferred are polymers which comprise at least two units represented by formula (I) and polymers which consist essentially of units represented by formula (I). One preferred embodiment is a dimer which may be represented by the formula

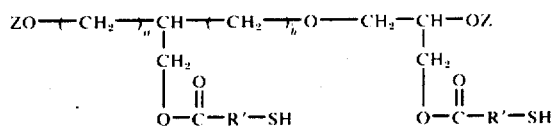

wherein Z is independently, each occurrence, hydrogen, alkyl (preferably $C_8$-$C_{20}$) or

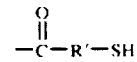

and one of $a$ and $b$ is zero and the other is one. Especially preferred dimers are those wherein —R'— is —CH$_2$— and dimers wherein all Z's are the same and are represented by one of

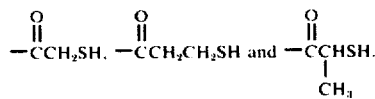

These dimers are prepared by suitable esterification of dimers of ring-opened tertiary-butyl glycidyl ether initiated by excess water or alkanol and separated, by suitable techniques such as gel permeation chromatography or distillation, from higher polymers. Dimers wherein both Z's are alkyl are prepared by acid-catalyzed capping of an alkanol-initiated dimer with another alkanol. Those wherein all Z's are the same are prepared by completely esterifying a water-initiated dimer with a single mercaptocarboxylic acid. Lesser degrees of esterification give a product wherein some Z's are hydrogen. A mixture of mercaptocarboxylic acids will give products of varying —R'—.

The invention compound is useful for preparing cross-linkable polymeric materials such as: a thermally curable mixture of said compound with a polyoxirane composition; a polysulfide polymeric material; or a radiation-curable mixture of said compound with a polyethylenically unsaturated composition. The invention may simultaneously serve as a reactive diluent for these mixtures. By polyoxirane is meant a composition having multiple unopened

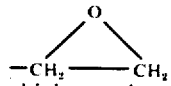

groups thereon. The higher molecular weight materials are especially useful as self-contained, oxidatively-curable compositions that generally form tack-free films.

DETAILED DESCRIPTION OF THE INVENTION

The polymercaptan condensation polymers of the invention have a great diversity of structure. This is due to their precursors which are polyoxyalkylene compounds having two or more ring-opened glycidol units of the formula

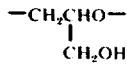

in the polyether chain to provide reactive sites which may be esterified with mercaptocarboxylic acids. Such polyhydroxy-functional precursors may be prepared by condensation polymerization of glycidol, with or without other alkylene oxides, but such a process will yield a highly branched product due to the self-initiating action of glycidol monomer. We prefer to prepare the polyhydroxy polyether precursors by condensation polymerization of tertiary-butyl glycidyl ether alone or with other alkylene oxides such as ethylene oxide, propylene oxide, butylene oxide, epichlorohydrin, epibromohydrin, glycidol (in minor quantities), phenyl glycidyl ether, styrene oxide, oxetanes, tetrahydrofuran and the like.

Highly linear polyethers (preferred as precursors for the invention) may be obtained when glycidol is not employed as one of the reactants. The hydroxy-functionality on such a linear polymer is then obtained by dealkylating the units of the formula

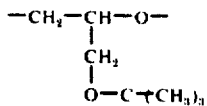

which result from ring-opening of the t-butyl glycidyl ether monomer (hereinafter tBGE). The invention compounds comprising only one unit of formula (I) must be prepared by condensation of tBGE with a suitable alkylene oxide rather than from glycidol since oxyalkylation of the primary hydroxyl of glycidol will otherwise occur and $x$ will not be zero as designated.

Dealkylation is accomplished by contacting the tBGE condensation product under essentially anhydrous conditions, i.e. about 5% or less water by weight, with a sulfonic acid at a temperature of about 90° to about 160°C. The sulfonic acid employed is suitably para-toluenesulfonic acid or isethionic acid. About 1 to 5 percent of the acid, based on the weight of the polymer, will be sufficient for dealkylation. While it is generally desirable to completely dealkylate, the dealkylation reaction may be followed by observing the generation of gaseous isobutylene and stopped by lowering the temperature and neutralizing the acid at any degree of dealkylation desired. When only partial dealkylation occurs, a number of units having pendant tertiary-butoxy groups will remain in the polyether precursor. These groups will be removed in the esterification step, as mentioned below.

Precursors of the invention compounds wherein $x$ is not zero in one or more occurrences are obtained by condensation polymerization of glycidol, with or without comonomers, or as noted below. As noted above, a highly branched material of generally random structure will be obtained when glycidol is employed. Designed precursors of the invention compounds having controlled $x$ number and the desired —RO— moieties may be prepared by first preparing a polymer from tBGE, dealkylating to the extend desired, and thereafter condensing the dealkylated, polyhydroxy polymer with selected alkylene oxides of the formula

A single alkylene oxide may be employed as may alkylene oxide mixtures to give a uniform —RO— structure or a random mix of various —RO— moieties, respectively. Block condensation may likewise be performed by first condensing the desired quantity of one alkylene oxide with the polyhydroxy polymer and thereafter sequentially condensing the resulting product with selected quantities of one or more other alkylene oxides. The final blocked or random product may then be esterified in the fashion described below. Subsequent dealkylation of any remaining t-butyl groups prior to esterification gives a product where $x$ is both zero and a positive integer, in different units. Numerous permutations and combinations of the invention polymers may be prepared in this manner.

The polyether precursors may be initiated with any suitable compound having active hydrogen-functionality such as alcohols, thiols, polyols, polythiols, water and the like. Especially suited for the initiator are compounds such as methanol, water, ethylene glycol, propylene glycol, bisphenol A and the like when a high degree of branching is not desired. If a more highly branched polyether is desired, higher polyols such as glycerol or pentaerythritol may be utilized or glycidol may be employed as a comonomer, as mentioned above.

The catalyst to be employed for the condensation polymerization of the tBGE and comonomers is suitably any well known alkylene oxide catalyst; e.g., a Lewis acid such as $BF_3$, $AlCl_3$, $SnCl_3$ and the like or a base such as an alkali metal hydroxide, a pyridinium salt, an organic amine and the like. When a base catalyst is employed, the tBGE units are to a very great extent regularly oriented in their ring-opening condensation in a "head to tail" fashion. When the polymer is prepared under acidic conditions, the product is generally randomly oriented.

The other precursors utilized to prepare the invention compounds are mercaptocarboxylic acids represented by the formula

or mixtures thereof, wherein R' is a bivalent hydrocarbon radical such as alkylene, cycloalkylene, arylene, aralkylene, alkarylene and the like of about 1 to 20 carbon atoms. Examples of suitable representative mercaptocarboxylic acids are mercaptoacetic acid, 2-mercaptopropionic acid, 3-mercaptopropionic acid, 4-mercaptocyclohexanecarboxylic acid, 8-mercaptooctadecanoic acid, para-mercaptobenzoic acid, 2-(para-mercaptophenyl) acid, para-mercaptobenzoic acid, 2-(para-mercaptophenyl)acetic acid, para-(3-mercapto-n-propyl)benzoic acid and the like. Preferred in the preparation of the compounds of the invention are mercaptoalkanoic acids especially those of about 1 to 6 carbon atoms and most preferred are mercaptoacetic acid, 2-mercaptopropionic acid, and 3-mercaptopropionic acid. Also, preferred invention polymers are those wherein —R'— is the same, each occurrence, that are prepared by using a single mercaptocarboxylic acid for esterification rather than a mixture of such acids.

ESTERIFICATION CONDITIONS

Esterification may be carried out simultaneously with the dealkylation reaction. However, when this method is used the final product will, to a degree, contain units of the formula

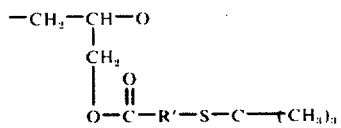

(IV)

where the tertiary-butyl group has replaced the active hydrogen of the mercapto group. Condensation polymers containing these units are within the scope of the invention where at least one unit of formula (I) is present. Preferably, at least the major portion of a condensation polymer of the invention consists of units of formula (I).

In a preferred method of preparing the invention polymers, tBGE monomer will be first polymerized, alone or with suitable comonomers, and the polyether product optionally purified, by fractional distillation for lower weight polyethers or by GPC for higher molecular weights, with subsequent dealkylation to the extent desired and, optionally, oxyalkylated then further dealkylated as described above. After dealkylation is complete the "polyglycidol" is esterfied with the desired mercaptocarboxylic acid or acids.

The esterification is carried out by contacting, in the presence of a Lewis acid or protonic acid catalyst, the chosen mercaptocarboxylic acid or mixed mercaptocarboxylic acids with the polyhydroxy-functional polyether (hereinafter polyglycidol) suitably at a temperature of about 50° to 150° C. The esterification catalyst employed is suitably any Lewis acid or protonic acid, e.g. p-toluenesulfonic acid as in dealkylation. It is employed in an amount of suitably about 0.5–5 percent, based on the weight of the polymer to be esterfied, preferably 1–2 weight percent. The esterification reaction is most preferably conducted in a suitable inert solvent under reflux conditions with continuous removal of the water by-product by means of a modified Dean Stark trap or the like; such solvents are toluene, benzene, cyclohexane, and the like. The autogenous presssure of the reaction mixture is generally suitable for esterification but a vacuum may be employed with beneficial results to attain reflux conditions, especially in the instance of higher molecular weight polyglycidols.

When esterification has been completed to the extent desired, residual acid is preferably neutralized and the salts washed out and the reaction mixture is then heated under vacuum to strip excess solvent and water. The degree of esterification may be controlled by restricting the amount of mercaptocarboxylic acid present in the reaction mixture to an amount sufficient to esterify only to the degree desired. This can be determined by measuring the hydroxyl number of the polymer and then calculating the quantity of mercaptocarboxylic acid necessary to provide the desired degree of esterification. Alternatively, excess acid can be used and the course of the reaction monitored by measuring the water produced. The reaction can then be stopped at any desired point.

The reaction products vary from low to high viscosity liquids or waxy solids at the higher molecular weights. The products may be hydrophilic or hydrophonic, depending on the amount of comonomer and the nature thereof. For example, if the polyoxyalkylene backbone contains a relatively high ratio of ring-opened ethylene oxide units in relation to (I) units or if —RO— is oxyethylene and x substantial, the end product will generally be a hydrophilic, even water-soluble material. On the other hand, where a substantial quantity of butylene oxide or styrene oxide units are present in the backbone or as —RO— units, the product will tend to be more hydrophobic in nature and organic solvent-soluble. Hydrophobicity may also be imparted to the product by esterification of a suitable number of pendant hydroxymethyl groups with higher carboxylic acids, e.g. stearic, 2-ethyl hexanoic, benzoic, in the manner described for mercaptocarboxylic acids.

To obtain a product of relatively uniform molecular weight, one may suitably fractionate the precursors, prepared by polymerization of tBGE, prior to dealkylation.

The invention compounds are self-curable when rendered basic and then exposed to molecular oxygen, air, peroxides or another oxidizing agent and form films or coatings of a tack-free nature. The invention polymers may also be mixed with other curable compositions such as polyoxiranes, polyethylenically unsaturated materials and the like. Such mixed systems may be cured using art-recognized techniques by exposure to thermal energy or radiation sources such as electron beam radiation, gamma radiation, alpha radiation, ultraviolet radiation and the like to give hard, tack-free coatings. In an ethylenically unsaturated system containing the invention compounds, a radical initiator such as azobisisobutyronitrile (hereinafter AIBN), a peroxide such as benzoyl peroxide, a diaryl ketone such as benzophenone, or other sensitizer suitable for the curing source to be employed or a mixture of sensitizer and initiator is combined with the curable mixture. As noted before, the invention compounds themselves, when rendered basic, may be oxidatively-cured upon exposure to air. The more basic they are, the more sensitive they are to the oxidizing agent employed.

SPECIFIC EMBODIMENTS OF THE INVENTION

Precursors

The polyglycidol precursors of the invention compounds were prepared by in initiating tBGE condensation homopolymerization, or copolymerization with alkylene oxide, on materials such as methanol, water, glycerol, bisphenol-A, ethylene or triethylene glycols and the like. The polymerization catalyst employed was $BF_3$ or a concentrated potassium hydroxide solution in from about 1 to 5 weight percent of the catalyst, based on the weight of the monomer mixture. The polymerization product was then neutralized to remove the remaining catalyst and topped under vacuum to remove any neutralization by-products and impurities.

Esterification was carried out by contacting the polymeric precursor with the appropriate mercaptocarboxylic acid, in some instances simultaneous with dealkylation, in the presence of para-toluenesulfonic acid at about 100° to 130° C. The product was then neutralized with base and heated under vacuum to remove excess water after water washing to remove salts. The products from this esterification contain S-t-butyl groups as well as mercapto end groups.

In other runs, dealkylation was completed before the esterification commenced. The polyglycidol product was then esterified with the appropriate quantity of mercaptocarboxylic acid and the product recovered. Typical preparations are shown below.

EXAMPLE 1

Homopolymer

A homopolymer of tBGE was prepared, using methanol as initiator and $BF_3$ as the catalyst, to give a material of about 700 molecular weight. 266 Grams of this polymeric product was then contacted with about 5.13 grams of p-toluenesulfonic acid and 247 grams 3-mercaptopropionic acid in a 3-necked round bottom flask with thermal well, nitrogen purge line, Dean-Stark trap and stirring apparatus. The Dean-Stark trap was connected in a series to an ice trap and another Dry Ice-methylene chloride trap. The flask was wrapped with aluminum foil to insulate it and heated with a heating mantel. With a nitrogen purge and using about 400 ml. of toluene as a solvent, the temperature was raised to approximately 110° C. This temperature was maintained for about 3 hours. About 39 grams of water was collected in the traps. From the amount of water collected, it was determined that a total hydroxyl functionality of about 6.1 per molecule had been esterified.

Nuclear magnetic resonance (NMR) spectroscopy indicated that the product was a polymer containing the repeating unit represented by the formula

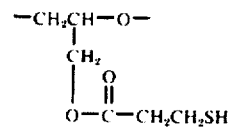

and also contained about 10 percent of S-t-butyl groups where the tertiary-butyl group had replaced the active hydrogen of the mercapto groups. After neutralization of the acid, several water washes and topping of the product under vacuum at about 98 C., a liquid product of low viscosity and a light brown color was recovered.

EXAMPLES 2-5

In the manner of Example 1, polymers were prepared from t-butyl glycidyl ether alone or with ethylene oxide in varying proportions. The catalysts employed were all basic, e.g. KOH, NaOH and Na metal. Initiators used were water and methanol. Mercaptoacetic acid rather than 3-mercaptopropionic acid was employed for the esterification reactions which were carried out simultaneously with dealkylation in the presence of 1-2 weight percent p-toluenesulfonic acid. The products of these reactions are characterized in Table I below.

EXAMPLES 6-2

The following embodiments of the invention were carried out in a manner similar to that of Examples 1-5 except that the tBGE polymerization products (prepared as in Examples 2-5 with basic catalysts) were completely dealkylated with p-toluenesulfonic acid before esterification was carried out. As in Examples 2-5, mercaptoacetic acid was employed for esterification. The oxyalkylene backbone consisted of adducts of tBGE and ethylene oxide, propylene oxide, butylene oxide or homopolymers of tBGE alone. The products of the Examples 6-20 are characterized in Table I below.

Molecular weights reported therein are based on weight average molecular weights which are approximations of the true molecular weight distribution. These molecular weights were determined experimentally from the number of hydroxyl groups present in the polymer to be dealkylated. This was accomplished by measuring the moles of acetic anhydride required to esterify a given weight of undealkylated tBGE polymer. The weight of the sample was then multiplied by the active hydrogen functionality of the initiator employed (water, glycol=2, glycerol=3, etc.) and the product was divided by the moles of acetic anhydride consumed to give the weight average molecular weight. From this molecular weight, the approximate molecular weight of the final esterified product was calculated by estimating the weight added by the number of ester units that would theoretically be added by the quantity of mercaptocarboxylic acid reacted. This depended, of course, on the molar ratio of tBGE present in a copolymer to be dealkylated, which was known from the prepolymerization mixture employed.

TABLE I

| Ex. No. | Composition of Polymer to be Esterified — Comonomers* and mole ratio | Initiator* | Molecular Weight | % Esterified (theo) | No. -SH/molecule (theo) | viscosity** | Comments |
|---|---|---|---|---|---|---|---|
| 1 | tBGE-homopolymer | MeOH | 952 | 100 | 6.13 | low | About 10-15% of -SH converted to -S-tBu |
| 2 | EO/tBGE=50/50 | water | 1276 | 100 | 9.50 | — | " |
| 3 | tBGE-homopolymer | water | 962 | 100 | 7.38 | low | " |
| 4 | EO/tBGE=75/25 | water | 906 | 100 | 7.00 | low | " |
| 5 | EO/tBGE=71/29 | MeOH | 397 | 100 | 3.00 | low | " |
| 6 | EO/tBGE=75/25 | Gly | 1391 | 100 | 6.85 | low | |
| 7 | EO/tBGE=70/30 | BPA | 2479 | 100 | 10.39 | med | |
| 8 | EO/tBGE=50/50 | water | 1470 | 100 | 8.79 | med | |
| 9 | EO/tBGE=75/25 | water | 980 | 100 | 4.91 | low | |
| 10 | EO/tBGE=90/10 | water | 5320 | 100 | 11.50 | high | solids present |
| 11 | EO/tBGE=50/50 | water | 1145 | 50 | 4.40 | med | |
| 12 | EO/tBGE=75/25 | water | 4956 | 100 | 19.11 | med | |
| 13 | EO/tBGE=50/50 | water | 698 | 100 | 4.77 | med-high | |
| 14 | EO/tBGE=75/25 | water | 765 | 41 | 2.00 | very low | |
| 15 | EO/tBGE=75/25 | EG | 4890 | 10 | 2.66 | very high | rubber skin on surface |
| 16 | EO/tBGE=75/25 | EG | 2282 | 100 | 9.40 | low-med | |
| 17 | PO/BO/tBGE=49/39/12 | EG | 2040 | 100 | 6.00 | low | |
| 18 | tBGE-homopolymer | water | 943 | 100 | 7.25 | low-med | |
| 19 | tBGE-homopolymer | TEG | 19,481 | 100 | 131.6 | rubbery | retain shape after mechanically distorted |
| 20 | tBGE-homopolymer | MeOH | 624 | 100 | 4.50 | low | |

*tBGE=butyl glycidyl ether; EO = ethylene oxide; PO = propylene oxide; BO = 1,2-butylene oxide;
*: Gly = glycerol; BPA = bisphenol A; EG = ethylene glycol; TEG = triethylene glycol
**: low = liquid that flows readily; med = thick, viscous liquid; high = viscous, resists flow

EXAMPLE 21

Thermal Cure of Polyoxirane Composition

A sample of the polymercapto compound of the invention prepared in Example 7 above was neutralized with basic solution to remove all traces of residual acid and was mixed with an equal weight of a diglycidyl ether of bisphenol A which was a low molecular weight liquid sold by The Dow Chemical Company under the trademark D.E.R. 331 epoxy resin. About 1% by weight of phosphoric acid was added as an accelerating agent. A thin layer of the liquid mixture was spread on a cold rolled steel plate and baked for about 1 hour at 65 C. The resulting coating showed 100% adhesion to the steel and good strength and flexibility.

EXAMPLE 22

Various Curable Systems

Equivalent amounts of the invention polymer of Example 20 and pentaerythritol triacrylate were mixed with about 1% by weight of benzophenone. An immediate exotherm was observed and the mixture began to gel. A thin layer of the gel was spread on a steel plate and subjected to UV radiation which cured it to a tack-free film. The UV radiation source utilized in this and other examples contained a medium pressure mercury arc lamp rated at 100 watts and was obtained from Illumination Industries, Inc. under the name Flexposure Unit Model 2100.

In a like manner, the same two reactants were mixed with about 1% of the benzoyl peroxide catalyst. Before all the catalyst had been dissolved, the reaction proceeded violently with an exotherm, smoke and popping. The resultant product was a hard polymer that had trapped catalyst particles within it. The same mixture with a 1% benzophenone catalyst was poured into a mold prepared by parallel placement of two wooden sticks about one and a half inch apart on a glass plate which had been covered with a polyester film. This mold was placed in an oven at 72° C for 2 hours after which time the cured polymer was stripped off the polyester coating. This polymer was soft and flexible. One-half of this coating was then subjected to UV radiation for 5 one-minute exposures; after this treatment it became a tough, flexible film.

Equivalent amounts of the polymercapto polymer of Example 20 and pentaerythritol triacrylate were mixed with 1% benzophenone and poured into a mold then exposed to UV radiation for 5 minutes per side. A tough, flexible polymer film resulted. Additional exposure for about 3 minutes per side resulted in a no noticeable change.

EXAMPLE 23

Comparative Curing

Equivalent amounts of the polymercapto polymer of Example 20 and diallyl phthalate were mixed with about 2% by weight of benzophenone. An exotherm was noted and the mixture began to gel. A coating of the mixture was spread on a steel plate and exposed for 60 seconds to UV radiation; a tack-free film resulted. Equivalent amounts of diallyl phthalate and a tetrakis(-mercaptopropionate) of pentaerythritol, obtained from Cincinnati Milacron Chemicals Inc. under the name of Mercaptate Q-43 Ester, were mixed with 2% benzophenone. A coating was made as above and cured for 4 minutes with UV radiation. The coating was not completely tack-free.

EXAMPLE 24

Oxidative Autocure

A sample of the invention compound produced in Example 6 was neutralized with sufficient base to render the sample basic and to completely destroy any residual acid that might be present. A thin film was spread on a steel plate and exposed to the atmosphere for approximately 4-5 hours after which time it was noted that a tough, polymeric film had formed which was resistant to water, acetone and methyl ethyl ketone. In a like manner, other compounds of the invention may be oxidatively cured under basic conditions to form tough, rubbery films by contacting them with an oxidizing agent.

We claim:

1. A condensation polymer comprising at least one unit represented by the formula

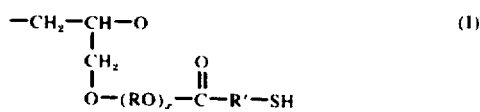

wherein R is independently in each unit the residue of a ring-opened alkylene oxide moiety; R' is independently in each unit a divalent $C_1$-$C_{20}$ hydrocarbon residue of a mercaptocarboxylic acid; and $x$ is independently in each unit zero or a positive integer up to about 100, provided that when said condensation polymer comprises only one unit represented by formula (I) it additionally comprises at least two units of a ring-opened alkylene oxide and $x$ is zero.

2. A polymer of claim 1 consisting essentially of units represented by formula (I).

3. A polymer described in claim 1 which further comprises at least one ring-opened comonomer selected from the group of alkylene oxides consisting of ethylene oxide, propylene oxide, 1,2-butylene oxide, 2,3-butylene oxide, epichlorohydrin, epibromohydrin, glycidol, n-butyl glycidyl ether, phenyl glycidyl ether, styrene oxide, and tetrahydrofuran.

4. A polymer described in claim 1 wherein $x$ is independently in each unit zero to 10.

5. A polymer described in claim 1 wherein R' is —CH$_2$CH$_2$— or

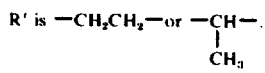

6. A polymer described in claim 1 wherein R' is —CH$_2$—.

7. A polymer described in claim 6 wherein $x$ is zero.

8. A polymer described in claim 7 which further comprises at least one ring-opened comonomer selected from the group of alkylene oxides consisting of ethylene oxide, propylene oxide, 1,2-butylene oxide, 2,3-butylene oxide, epichlorohydrin, epibromohydrin, glycidol, n-butyl glycidyl ether, phenyl glycidyl ether, styrene oxide, and tetrahydrofuran.

9. A polymer of claim 7 consisting essentially of units represented by formula

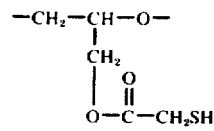

10. A polymer described in claim 7 which has a weight average molecular weight of from about 314 to about 20,000.

11. A polymer of claim 7 having a weight average molecular weight of about 698, containing about 4.77 mercapto groups per molecule, which consists essentially of units represented by formula (I) and ring-opened ethylene oxide units in about equimolar proportions.

12. A polymer described in claim 1 comprising at least two units represented by formula (I).

13. A polymer described in claim 12 represented by the formula

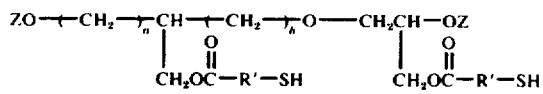

wherein Z is independently, each occurrence, hydrogen, alkyl or

and one of $a$ and $b$ is zero and the other is one.

14. The polymer described in claim 13 wherein —R'— is —CH$_2$—.

15. A polymer described in claim 13 wherein all Z's are represented by one of

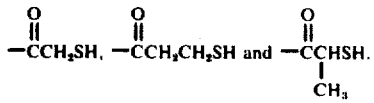

16. A mixture comprising a polymer described in claim 12 and at least one composition, selected from polyoxiranes and polyethylenically unsaturated materials, which is curable by the mercapto groups of said polymer to a tack-free film.

17. A curable mixture comprising a polymer described in claim 12, a polyethylenically unsaturated compound and a sensitizer and/or initiator for said compound.

18. A method of preparing a cross-linked polymeric material comprising subjecting the mixture of claim 17 to ultraviolet radiation sufficient to induce curing.

19. A method of preparing a cross-linked polymeric material comprising subjecting the mixture of claim 17 to electron beam radiation sufficient to induce curing.

20. A curable mixture comprising a polymer described in claim 12 and a polyoxirane compound.

21. A method of preparing a cross-linked polymeric material comprising exposing the mixture of claim 20 to thermal energy sufficient to induce curing.

* * * * *